United States Patent [19]

Klomp

[11] Patent Number: 4,693,420

[45] Date of Patent: Sep. 15, 1987

[54] AIR-ASSIST FUEL INJECTION NOZZLE

[75] Inventor: Edward D. Klomp, Mount Clemens, Mich.

[73] Assignee: General Motors Corporation, Detroit, Mich.

[21] Appl. No.: 900,093

[22] Filed: Aug. 25, 1986

[51] Int. Cl.$^4$ ............................................. F02M 47/00
[52] U.S. Cl. ....................................... 239/87; 239/91; 239/409; 123/447
[58] Field of Search .................................... 239/87–96, 239/408, 409; 123/447

[56]  References Cited

U.S. PATENT DOCUMENTS 2,984,230  5/1961  Cummins ............................ 123/140
4,406,404  9/1983  Horino et al. .................. 239/409 X
4,413,781 11/1983  Iwata .............................. 239/409 X Primary Examiner—Andres Kashnikow
Assistant Examiner—MaryBeth O. Jones
Attorney, Agent, or Firm—Arthur N. Krein

[57]  ABSTRACT

An air-assist fuel injection nozzle has an externally actuated needle plunger journaled for axial movement in the cylinder provided in a nozzle body. The needle plunger tip contains a central blind bore which communicates with discharge passages and with a supply passage, the latter, when the needle plunger is in a raised position, communicate with a valve controlled supply passage to receive a metered quantity of liquid fuel. Upon downward movement of the needle plunger a predetermined axial extent, the discharge passages come into flow communication with corresponding discharge orifices provided in the nozzle body. A central pedestal or pin upstanding from the lower closed end of the nozzle body substantially fills the blind bore in the needle plunger during the injection process in order to minimize the total clearance volume.

3 Claims, 5 Drawing Figures

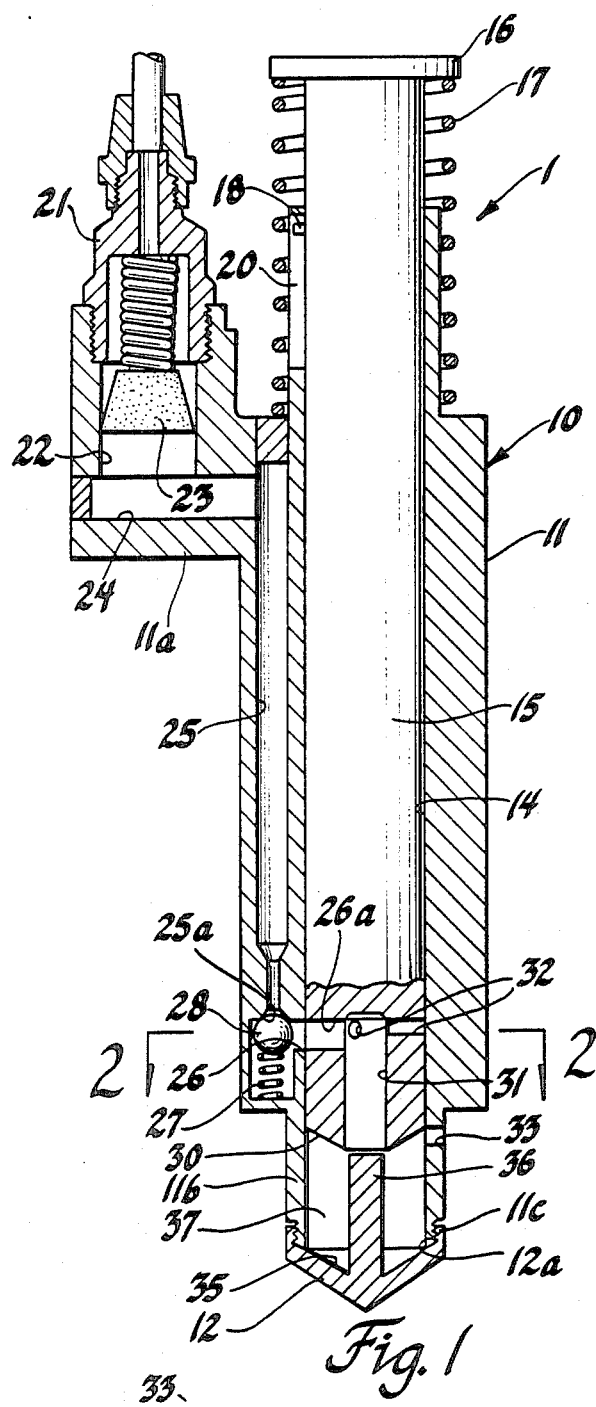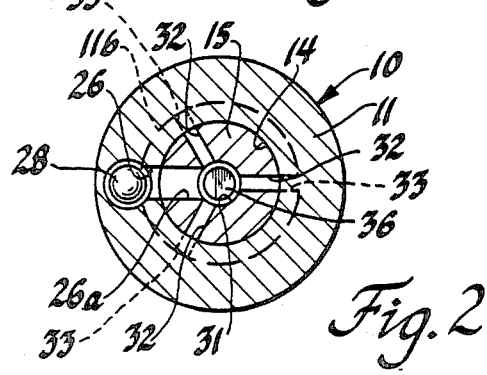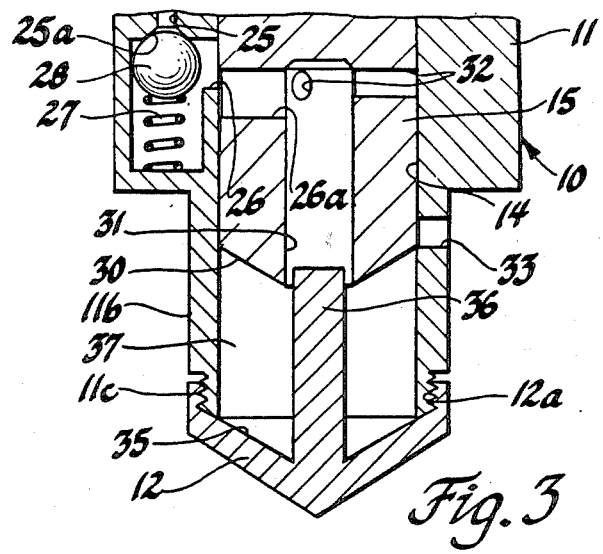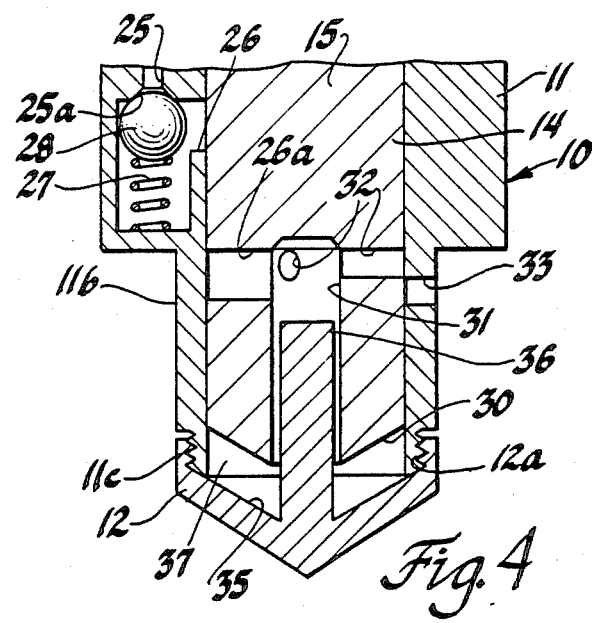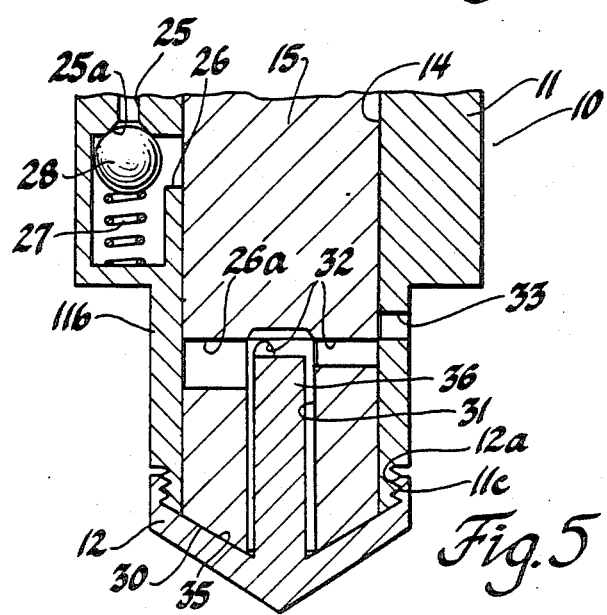

AIR-ASSIST FUEL INJECTION NOZZLE

FIELD OF THE INVENTION

This invention relates to fuel injection nozzles as used for the direct injection of a charge of fuel into the combustion chamber of an engine and, in particular, to an air-assist fuel injection nozzle.

DESCRIPTION OF THE PRIOR ART

The desirability of mixing an aeriform fluid with fuel during an injection cycle into the combustion chamber of an engine has long been recognized as a means to, in effect, reduce emission problems. For example, in direct injection of fuel into diesel engines, because of the pressures involved, such mixing of an aeriform fluid has normally been accomplished by a so-called air assist fuel injection nozzle of the type disclosed, for example, in U.S. Pat. No. 2,984,230 issued May 16, 1961 to Clessie L. Cummins. Such an air-assist fuel injection nozzle normally includes an externally cam actuated, needle plunger reciprocably journaled in a cylinder provided in a nozzle body to define, in effect, a pump chamber which is supplied during, what may be referred to as, a suction stroke with a predetermined metered quantity of fuel into the variable volume pump chamber defined by the nozzle body and needle plunger. Thereafter, on a pump stroke, this metered quantity of fuel is pressurized so as to be discharged through a discharge passage means including one or more discharge orifices at the spray tip end of the nozzle body. After the injection cycle, as the needle plunger is retracted on its suction stroke, the aeriform fluid, including exhaust gases, from the combustion chamber can flow, via the discharge passage means, into the pump chamber so as to mix with the next charge of metered fuel flowing into the pump chamber, and to specifically mix with this fuel during the next pump stroke of the needle plunger. Thus the term air-assist fuel injection nozzle.

However, in all such known prior art air-assist fuel injectors, a so-called "sac volume" of liquid fuel will remain in the discharge passage means and, especially in the discharge orifices, which can then be sucked into the combustion chamber or carbonized during the rapid in-cylinder pressure drop which occurs during the blow-down process as the exhaust valve opens which causes unburned fuel to expand in the sac volume of the injector.

SUMMARY OF THE INVENTION

This invention relates to an air-assist fuel injection nozzle for the direct injection of a charge of fuel and air into an associate combustion chamber in an internal combustion engine, this injection nozzle including an externally cam actuated needle plunger reciprocably journaled in a bore in a nozzle body having at least an inlet passage means opening at one end into the bore at a predetermined axial extent and which is connectable at its opposite end to receive a predetermined metered quantity of fuel. The needle plunger at its lower end is of frusto-conical configuration and is provided with an axial bore that intersects a radial supply port, which is in flow communication with the inlet passage means when the needle plunger is in its raised position, and a plurality of circumferentially spaced apart radial discharge ports. The spray tip end of the nozzle body is of straight walled configuration and terminating at an enclosed end of complementary internal frusto-conical configuration that is provided with an internal upstanding pedestal or piston pin slidably receivable in the axial bore of the needle plunger. In addition, the straight walled portion of the spray tip end is provided with a plurality of circumferentially spaced apart discharge orifices equal in number and radially and axially oriented so as to come into flow communication with associate discharge ports during a pump stroke of the needle plunger and which are open to the combustion chamber when the needle plunger is raised on its suction stroke so that air and exhaust gases can flow into the interior of the spray tip end of the nozzle body whereby to mix with the next charge of metered fuel so that air, residual exhaust gases and vaporized fuel with whatever liquid fuel remains will be injected into the combustion chamber during the next pump stroke of the needle plunger.

It is therefore a primary object of this invention to provide an improved air-assist fuel injection nozzle wherein the needle plunger of the nozzle assembly is provided with a central bore to slidably receive a pin in the spray tip end of the nozzle and with radial discharge ports arranged to communicate with side discharge orifices during the final stages of a pump stroke of the needle plunger, these discharge orifices being otherwise closed by the needle plunger during the initial stages of the pump stroke.

Another object of the invention is to provide an air-assist fuel injection nozzle for use with different types of fuel for direct injection type internal combustion engines which has the operating needle plunger thereof adapted to circumvent so-called "sac volume" leakage of fuel into an associate combustion chamber of the engine.

For a better understanding of the invention as well as other objects and further features thereof, reference is had to the following detailed description of the invention to be read in connection with the accompanying drawings.

BRIEF DESCRIPTION OF THE DRAWINGS

FIG. 1 is a longitudinal sectional view of an air-assist fuel injection nozzle in accordance with the invention, with the needle plunger thereof shown partly in elevation and in its fully retracted or maximum lift position;

FIG. 2 is a sectional view taken along line 2—2 of FIG. 1 to show the fuel supply port and fuel discharge ports of the needle plunger;

FIG. 3 is a sectional view of the lower portion of the injection nozzle of FIG. 1, but with the needle plunger moved on a so-called pump stroke to a position in which the injector discharge orifices are covered;

FIG. 4 is a sectional view similar to FIG. 3, but with the needle plunger now moved to an axial position relative to the discharge orifices so that injection is about to begin; and, FIG. 5 is a sectional view similar to FIGS. 3 and 4, but with the needle plunger now positioned at the end of its pump stroke with the discharge orifices again being covered.

Referring first to FIG. 1, the air-assist fuel injection nozzle, generally designated 1, is adapted to be used to inject fuel into an associate combustion chamber of an internal combustion engine of the type wherein the combustion chamber is defined by a cylinder having a piston reciprocably journaled therein, with this piston being operatively connected to the crankshaft of the engine, none of these engine elements being shown, since they are conventionally known in the art and thus form no part of the subject invention.

In accordance with the invention and in the construction shown, the air-assist fuel injection nozzle 1 includes, for ease of manufacture and assembly, a two-part nozzle body means 10 that includes a tubular main nozzle body 11 with an integral side extension portion 11a and a closed injector nozzle tip 12 that is suitably secured, as in a manner to be described, to the lower reduced diameter spray tip end 11b of the main nozzle body 11. Thus in the construction illustrated, the spray tip end 11b at its free end is provided with external threads 11c for mating engagement with the internal threads 12a on the injector nozzle tip 12.

As shown, the main nozzle body 11 is provided with an axial through bore to define a bushing 14 to slidably receive a needle plunger 15. The upper end of the plunger 15 is provided with a radial flanged follower 16 so as to be actuated in a downward direction against the biasing force of a plunger return spring 17 in conventional manner, as by an engine driven cam, not shown, having a predetermined cam lobe profile for a purpose to be described hereinafter.

A conventional guide pin 18 fixed to the needle plunger 15 rides in a guide slot 20 in the upper portion of the main nozzle body 11 to effect angular location of the needle plunger and to limit its upward travel.

In the construction shown, a fuel line connector 21 is threadingly connected to the internally threaded vertical fuel inlet passage 22 in side extension portion 11a which also contains a fuel filter 23 retained in a conventional manner well known in the art. The lower end of passage 22 connects with one end of a radial passage 24, the opposite end of which connects with a vertical stepped supply passage 25 that extends parallel to the axis of the bushing 14 so as to connect adjacent to its lower end with a radial supply passage 26 opening through the wall defining the bushing 14 at a predetermined axial location. Flow communication between the supply passage 25 and radial supply passage 26 is controlled by a one-way check valve in the form of a spring 27 biased ball valve 28 adapted to seat against a valve seat 25a formed by the internal radial wall defining a part of the reduced diameter portion of the supply passage 25.

Now in accordance with a feature of the invention, the lower end 30 of the needle plunger 15 is of frusto-conical configuration and has an axial blind bore 31 of predetermined diameter extending upward from the free lower end a predetermined axial extent, with this bore connecting in flow communication with the radial supply passage 26 by means of a radial passage 26a. This bore 31 is also in flow communication with a plurality of circumferentially spaced apart radial discharge ports 32 formed in the needle plunger 15, three such discharge ports 32 being used in the embodiment illustrated, as best seen in FIG. 2. These discharge ports 32 are radially and axially orientated so as to come into flow communication with associate radial discharge orifices 33 formed in the reduced diameter spray tip end 11b of the nozzle body 11 just prior to the end of a so-called pump stroke of the needle plunger 15.

Also in accordance with a feature of the invention, the injector nozzle tip 12 is provided with an annular frusto-conical lower inner wall 35 formed complementary to the lower end 30 of the needle plunger 15 and with a central upstanding pedestal or pin 36 of a predetermined axial extent that is loosely slidably received in the bore 31. Thus during a pump stroke of the needle plunger 15, the diametrical clearance between the outer peripheral surface of the pin 36 and the inner peripheral surface defined by bore 31 will permit air, exhaust gases, fuel vapors and liquid fuel to freely flow through this clearance annulus, it being noted that this clearance annulus is shown relatively large, for purpose of illustration only.

It will be appreciated that preferably during assembly of the injector nozzle tip 12 to the spray tip end 11b of the nozzle body 11, the nozzle body 11 with the needle plunger 15 mounted therein would be mounted on a suitable assembly fixture, not shown, with needle plunger 15 moved to its end of pump stroke position. The injector nozzle tip 12 is then threaded onto the spray tip end 11b until its inner wall 35 abuts against the lower end 30 of the needle plunger after which it is rotated a predetermined amount away from the lower end 30 so as to provide a predetermined small clearance, as desired, between these surfaces. The injector nozzle tip 12 is then suitably secured, as by a laser beam weld, to the spray tip end 11b to prevent relative rotation between these elements.

Function Operation

When the needle plunger 15 is in the maximum lift position shown in FIG. 1, it is preferably held in this position by a suitable profile of the cam and its base circle not shown, so that it stays in this position covering a crank angle period of an engine crankshaft, not shown, including some of the intake and compression processes. This permits the charging of the injector clearance volume first with liquid fuel, as supplied from a suitable distributor type fuel pump, not shown, via the passages 22, 24, 25, 26 and 26a and then with hot compressed gases from an associate combustion chamber, not shown, via the then uncovered discharge orifices 33 into the variable volume chamber 37 defined by the lower end 30 of the needle plunger 15 and the lower inner wall 35 of the closed injector nozzle tip 12. Energy from these hot gases are then used to initiate vaporization of some of the liquid fuel previously supplied, as described above.

It will be apparent that when the needle plunger 15 is in the position shown in FIG. 1, compressed gases cannot enter the fuel supply line 25 because of the check valve 28.

Thereafter, when the cam, not shown, initiates downward motion of the needle plunger 15, as to the position shown in FIG. 3, the outer peripheral land surface of the needle plunger 15 will cover the discharge orifices 33 before any significant charge is lost to the associate combustion chamber, not shown.

Continued downward motion of the needle plunger 15 compresses the trapped charge of fuel and aeriform fluid until the discharge ports 32 begin to uncover the discharge orifices 33, with FIG. 4 illustrating the position of the needle plunger 15 just prior to the occurrence of this event.

As the needle plunger 15 moves axially to a position at which the discharge ports 32 begin to uncover the associate discharge orifices 33, the actual injection cycle will commence rather abruptly because of the relatively high pressure achieved during the compression occurring by virtue of the volume reduction produced by the needle plunger 15 motion relative to the lower inner wall 35 of spray tip 12 and the relative motion of the pin 36 moving axially into the bore 31 in the needle plunger 15. It should be appreciated that during this downward movement of the needle plunger 15, the liquid fuel charge and the aeriform fluid in chamber 37 will mix and both will be compressed, with the aeriform fluid then also consisting of vaporized fuel.

Motion of the needle plunger 15 from that point to seating of the needle plunger 15 relative to the inner wall 35 of the spray tip 12, the position shown in FIG. 5 results in the final phase of injection.

Preferably, during the combustion and expansion processes which will then occur in the associate combustion chamber, not shown, the needle plunger 15 should remain in the seated or down position shown in FIG. 5 until just before the exhaust valve, not shown, for the associate combustion chamber, not shown, begins to open.

The profile of the cam, not shown, should be preferably formed so that during the initial phase of upward movement of the needle plunger 15 toward the position shown in FIG. 1, little reverse flow from the associate combustion chamber, not shown, enters the injection nozzle 1 via the discharge orifices 33 and discharge ports 32, until the discharge orifices are completely covered, as shown in FIG. 4. Then additional upward motion of the needle plunger 15 creates significantly lowered pressure within the chamber 37 defined by the lower end 30 of the needle plunger 15 and the lower inner wall 35 of the nozzle tip 12, which can be used to prevent any flow of aeriform fluid from leaving the chamber, if the discharge orifices 33 opening as shown in FIG. 1, is timed properly with respect to the opening of the exhaust valve for initiation of the blow-down process in the associate combustion chamber, not shown.

By appropriate cam control and proper fuel metering timing, loss of a fresh liquid fuel charge from the injection nozzle to the exhaust can be completely eliminated because once the needle plunger 15 reaches the upward position shown in FIG. 1, it is held there until the next injection cycle is to be initiated. Thus no fuel loss should occur during the exhaust stroke of the piston, not shown, since the pressure within the chamber 37 remains at essentially that in the exhaust system for the engine, not shown.

While the invention has been described with reference to the structure disclosed herein, it is not confined to the specific details set forth, since it is apparent that modifications and changes can be made by those skilled in the art. This application is therefore intended to cover such modifications or changes as may come within the purposes of the improvements or scope of the following claims.

The embodiments of the invention in which an exclusive property or privilege is claimed are defined as follows:

1. An air-assist fuel injection nozzle for use in discharging fuel into an associate combustion chamber of an internal combustion engine, said injection nozzle including a nozzle body means having a spray tip end at one end thereof that includes an outer straight walled, spray tip portion which terminates at an enclosed end having an internal wall of frusto-conical configuration with a central pin upstanding therefrom, said straight walled spray tip portion having a plurality of radial discharge orifices extending therethrough; an axial bore in said body means extending from the opposite end thereof to define a bushing, a needle plunger reciprocably received in said bushing between a fully raised position and a fully depressed position corresponding to the end of a suction stroke and the end of a pump stroke, respectively, one end of said needle plunger extending outward from said opposite end of said nozzle body means so as to be externally actuatable, the opposite end of said needle plunger having a blind bore extending a predetermined axial extent and of an internal diameter to slidably receive said central pin, said needle plunger having a radial supply passage and a plurality of circumferentially spaced apart radial discharge ports angularly aligned with said radial discharge orifices, wherein said discharge ports are in flow communication with said blind bore, said needle plunger and the interior portion of said enclosed end of said nozzle body means defining a variable volume pump chamber, said nozzle body means including a supply passage means with a check valve therein in fluid communication with said radial supply passage when said needle plunger is in said raised position, the opposite end of said supply passage means being connectable so as to sequentially receive a metered quantity of pressurized fuel, said needle plunger allowing aeriform fluid flow from said associate combustion chamber into said pump chamber through said radial discharge orifices when said needle plunger is in said raised position and when said needle plunger is on a said pump stroke, said needle plunger blocking flow through said radial discharge orifices until such time as said needle plunger has moved a predetermined axial extent so that said radial discharge ports come into alignment with said radial discharge orifices to initiate an air-assist discharge of air, fuel vapors and fuel from said radial discharge orifices.

2. An air-assist fuel injection nozzle for use in discharging fuel into an associate combustion chamber of an internal combustion engine, said injection nozzle including a nozzle body means having a spray tip end at one end thereof that includes an outer reduced external diameter, straight walled, spray tip portion which terminates at an enclosed end having an internal wall of frusto-conical configuration with a central pin upstanding therefrom, said straight walled spray tip portion having a plurality of radial discharge orifices extending therethrough at a predetermined axial extent; an axial bore in said body means extending from the opposite end thereof from said spray tip portion to define a bushing, a needle plunger reciprocably received in said bushing between a fully raised position and a fully depressed position corresponding to the end of a suction stroke and the end of a pump stroke, respectively, one end of said needle plunger extending outward from said opposite end of said nozzle body means so as to be externally actuatable, the opposite end of said needle plunger having a blind bore extending a predetermined axial extent and of an internal diameter to slidably receive said central pin, said needle plunger having a radial supply passage and a plurality of circumferentially spaced apart radial discharge ports in flow communication with said blind bore, each of said discharge ports being angularly aligned relative to an associate one of said discharge orifices; said needle plunger and the interior portion of said enclosed end of said spray tip portion of said nozzle body means defining a variable volume pump chamber, said nozzle body means including a supply passage means with a check valve therein in fluid communication with said radial supply passage when said needle plunger is in said raised position, the opposite end of said supply passage means being connectable so as to sequentially receive a metered quantity of pressurized fuel, said needle plunger allowing aeriform fluid flow from said associate combustion chamber into said pump chamber through said radial discharge orifices when said needle plunger is in said raised position and when said needle plunger is on a said pump stroke, said needle plunger blocking flow through said radial discharge orifices until such time as said needle plunger has moved a predetermined axial extent so that said radial discharge ports come into alignment with said radial discharge orifices to initiate an air-assist discharge of air, fuel vapors and fuel from said radial discharge orifices.

3. An air-assist fuel injection nozzle for use in discharging fuel into an associate combustion chamber of an internal combustion engine, said injection nozzle including a nozzle body means having a spray tip end at one end thereof that includes an outer straight walled, spray tip portion which terminates at an enclosed end having an internal wall of frusto-conical configuration with a central pin upstanding therefrom, said straight walled spray tip portion having a plurality of radial discharge orifices extending therethrough; an axial bore in said body means extending from the opposite end thereof to define a bushing, an externally actuated needle plunger reciprocably received in said bushing for movement between a fully raised position, the inboard end of said needle plunger having a blind bore extending upward therein a predetermined axial extent with said blind bore having an internal diameter to slidably receive said central pin, said needle plunger having a radial supply passage and a plurality of circumferentially spaced apart radial discharge ports in flow communication with said blind bore, each of said discharge ports being angularly aligned relative to an associated one of said discharge orifices, said needle plunger and the interior portion of said enclosed end of said nozzle body means defining a variable volume pump chamber, said nozzle body means including a supply passage means with a check valve therein in fluid communication with said radial supply passage when said needle plunger is in said raised position, the opposite end of said supply passage means being connectable so as to sequentially receive a metered quantity of pressurized fuel, said needle plunger allowing aeriform fluid flow from said associate combustion chamber into said pump chamber through said radial discharge orifices when said needle plunger is in said fully depressed position and when said needle plunger is moving from said raised position toward said depressed position said needle plunger will block flow through said radial discharge orifices until such time as said needle plunger has moved a predetermined axial extent so that said radial discharge ports come into alignment with said radial discharge orifices to initiate an air-assist discharge of air, fuel vapors and fuel from said radial discharge orifices.

* * * * *